(No Model.)

E. WOOD.
ANIMAL TRAP.

No. 374,135. Patented Nov. 29, 1887.

WITNESSES:
John A. Ellis
C. Sedgwick

INVENTOR:
E. Wood
BY Munn & Co.
ATTORNEYS.

UNITED STATES PATENT OFFICE.

EVANS WOOD, OF LYONS, TEXAS.

ANIMAL-TRAP.

SPECIFICATION forming part of Letters Patent No. 374,135, dated November 29, 1887.

Application filed July 29, 1887. Serial No. 215,628. (No model.)

*To all whom it may concern:*

Be it known that I, EVANS WOOD, of Lyons, in the county of Burleson and State of Texas, have invented a new and Improved Animal-Trap, of which the following is a full, clear, and exact description.

My invention relates to a trap designed more particularly to catch burrowing animals, and has for its object to provide a simple, inexpensive, durable, and effective device of this character.

The invention consists in certain novel features of construction and combinations of parts of the animal-trap, all as hereinafter described and claimed.

Reference is to be had to the accompanying drawings, forming a part of this specification, in which similar letters of reference indicate corresponding parts in both figures.

Figure 1:
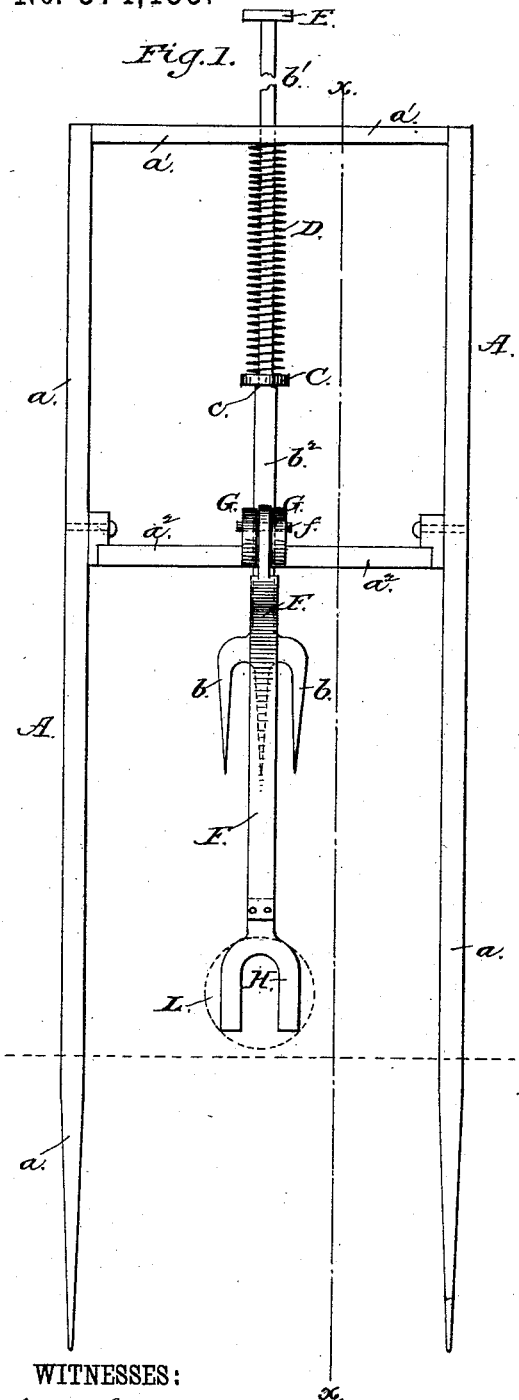
Figure 2:
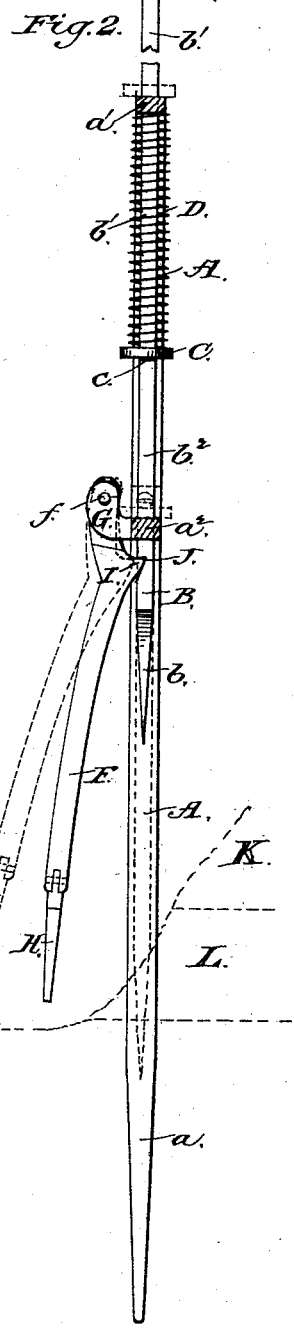

Figure 1 is a front view of my improved animal-trap with the earth and the animal's burrow indicated in dotted lines, and Fig. 2 is a side or edge view thereof with the trap-frame in section on the line $x\ x$ in Fig. 1.

The frame A of the trap is made with two side bars, $a\ a$, which are pointed at their lower ends, and at and near their upper ends are connected rigidly to and by cross-bars $a'\ a^2$ in any approved way. In these cross-bars the shank of the spear B is fitted to slide, the lower part, $b^2$, of the shank being made square or flat-sided and passing through a like-shaped slot in the cross-bar $a^2$, to prevent turning of the spear-head, which comprises two or three or more steel prongs, $b$, held to the shank. The upper part, $b'$, of the spear-shank is smaller than its lower part, $b^2$, thereby providing a shoulder, $c$, on the shank, above which on the shank is fitted loosely a washer or collar, C, against which bears one end of a normally-expanding spring, D, placed on the shank, while the upper end of the spring bears against the top cross-bar, $a'$, of the frame, in which the part $b'$ of the spear-shank may slide freely.

The extremity of the spear-shank is provided with a nut, collar, or cross-head, E, which serves as a stop to the downward movement of the spear by the action of the spring, and also serves as a handle by which the spear may be raised against the tension of the spring D to set it by the aid of a trigger, next described.

The trigger F comprises a bar or rod which is pivoted at its upper end by a pin, $f$, to and between a pair of lugs, G G, fixed to the cross-bar $a^2$ of the trap-frame, and to the lower or free end of the trigger a ⌒-shaped or forked plate, H, is fixed by screws or bolts; or it may be made integral with the trigger-bar, if preferred. Near its fulcrum $f$ the trigger is provided with a toe, I, which is adapted to enter a notch, J, made in the outer face of the spear-shank.

In using the trap the pointed ends of its frame-bars $a\ a$ will be forced into the ground K until the end plate, H, of the trigger stands directly opposite the mouth of a burrow, L, made by a gopher, a ground-rat, a prairie-dog, or other animal, and when the trap is secured in this position the nut or head E of the spear B will be grasped by one hand, while the other hand rests on top of the frame cross-bar $a'$, and the spear will be drawn upward until its notch J comes opposite the toe I of the trigger, which then falls into the notch and holds the spear raised above the mouth of the burrow, as shown most clearly in Fig. 2 of the drawings. After the trap is set in this manner, an animal leaving the burrow will run against the trigger F, the end H of which is made broad or forked, as above described, to assure contact of the animal with the trigger, which swings the trigger outward, as shown in dotted lines in Fig. 2, and thereby swings the trigger-toe I from the spear-notch J, and allows the spring D to instantly and forcibly thrust the spear downward into the animal and either kill it outright or hold it until it is secured by the trapper.

It is obvious that by removing the spear nut or head E and the trigger-pivot $f$ both the spear and trigger may be removed from the frame to allow convenient and thorough cleaning or repair of all parts of the trap.

The trap may be made of any desired size to catch larger or smaller animals, and by the aid of suitable fastenings the trap may be secured flatwise over a hole in the ground, in which position it will operate equally well as when set vertically or at an angle, as will readily be understood.

I am aware that a sliding and spring-pressed rod having a forked lower end and held elevated by a trigger is not broadly new, and I therefore do not claim such invention.

Having thus described my invention, what I claim as new, and desire to secure by Letters Patent, is—

1. In an animal-trap, the combination, with the frame A, of the spear B, fitted to slide therein and provided with a notched shank, spring D, for forcing the spear down, and the trigger F, pivoted to the frame and provided with a forked plate at its lower end, and with a toe, I, for engaging the notch of the shank of the spear, substantially as herein shown and described.

2. The herein described animal-trap, consisting of the frame A, composed of the side bars, $a$, and cross-bars $a'$ $a^2$, the spear B, having its shank formed with the square part $b^2$ and the reduced portion $b'$, and provided with a shoulder, $c$, and notch J, the collar C, fitting loosely on the spear-shank, the spring D on the spear-shank between the upper cross-bar of the frame and the collar C, and the trigger F, pivoted to ears on the cross-bar $a^2$, and provided with the forked plate H at its lower end and with the toe I, engaging the notch J of the shank of the spear, as specified.

EVANS WOOD.

Witnesses:
T. D. FONTAINE,
A. J. RADFORD.